United States Patent [19]

Crook, Jr.

[11] 4,021,130
[45] May 3, 1977

[54] CHAIN TO WIRE ROPE CONNECTOR

[75] Inventor: Edward J. Crook, Jr., Tulsa, Okla.

[73] Assignee: American Hoist & Derrick Company, Tulsa, Okla.

[22] Filed: July 11, 1975

[21] Appl. No.: 595,098

[52] U.S. Cl. .................................. 403/275; 403/277
[51] Int. Cl.² ......................................... B25G 3/28
[58] Field of Search .......... 403/275, 277, 374, 301, 403/306, 313, 314

[56] References Cited

UNITED STATES PATENTS

| 985,915 | 3/1911 | Marchand | 403/275 |
| 1,824,005 | 9/1931 | Astley | 403/275 X |
| 1,941,113 | 12/1933 | Schwarz | 403/374 X |
| 2,016,856 | 10/1935 | Fiege | 403/275 X |
| 3,002,046 | 9/1961 | Clapper | 403/275 X |
| 3,570,074 | 3/1971 | Schimmeyer et al. | 403/267 |

Primary Examiner—Wayne L. Shedd
Attorney, Agent, or Firm—Head, Johnson & Chafin

[57] ABSTRACT

A device for connecting wire rope to a chain and comprising a wedge means adapted to be inserted into the center of one end of the wire rope for receiving the strands of the wire rope along the outer periphery thereof, said wedge means and rope strands receiving a socket member therearound whereby the rope strands are securely clamped between the wedge and the socket member, and a connector means threadedly engageable with the socket member and having pin means engageable with one link of the chain. The threading of the connector applies force against the wedge to increase the clamping pressure against the wire rope strands. The threaded end of the wedge provides a release means for easily removing the wire rope from the wedged connection.

5 Claims, 9 Drawing Figures

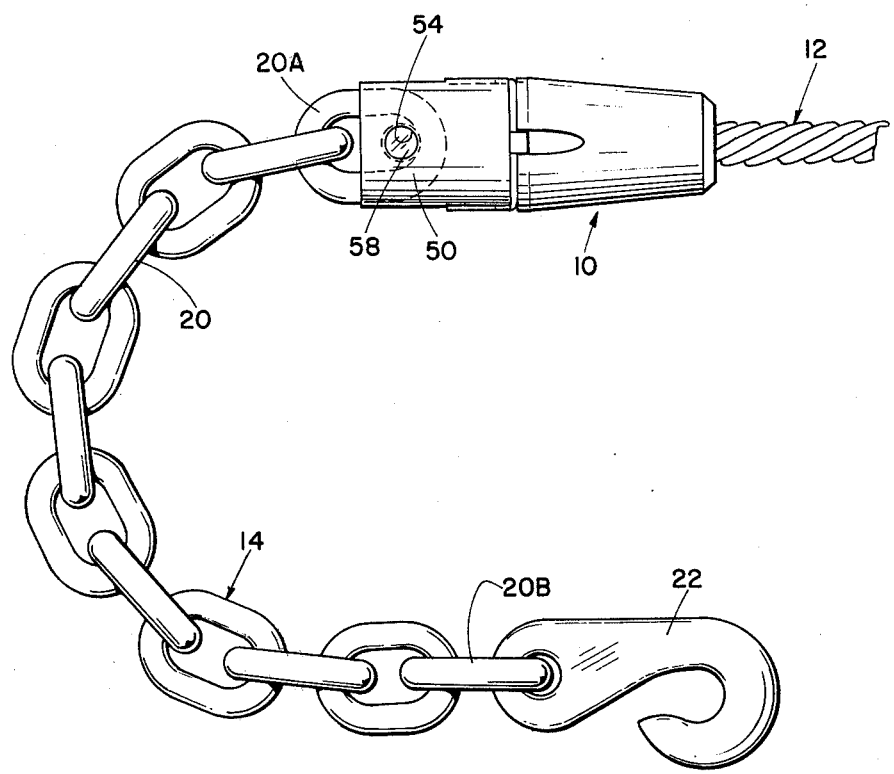
Fig. 1
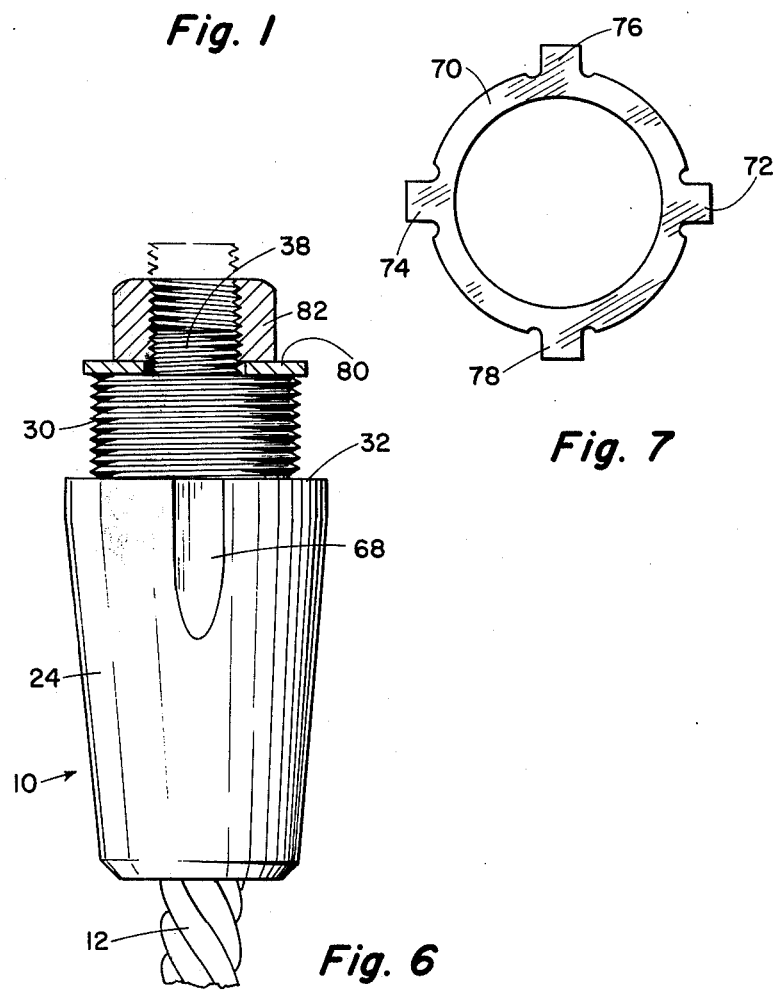
Fig. 7
Fig. 6

CHAIN TO WIRE ROPE CONNECTOR

BACKGROUND OF THE INVENTION

1. Field of the Invention

This invention relates to improvements in connector devices for chain slings and more particularly, but not by way of limitation, to a means for connecting wire rope to a chain.

2. Description of the Prior Art

There are many instances wherein it is desirable to secure or attach a wire rope to a chain. For example, a gin pole truck such as used in the oil and gas well industry is normally provided with a winch line constructed of a fiber core wire rope due to the necessity for great flexibility in spooling the rope onto relatively small diameter cable spooling drums. It is the usual practice to attach a tail chain at the end of the winch line. This tail chain normally comprises a plurality of chain links having a permanently attached hook at one end, the hook being of such a design that it will work efficiently with wire rope.

At the present time the most widespread method of securing or attaching wire rope to chain is by threading the wire rope through the last link of the chain and tying a knot in the wire rope. This type of connection greatly reduces the strength of the wire rope and, in fact, in laboratory tests it has been found that the breaking strength of the rope is approximately 55% of the catalog strength of the rope. In addition, many sections of the current Federal safety laws state that wire rope shall not be secured by knotting.

SUMMARY OF THE INVENTION

The present invention contemplates a novel connector device for securing wire rope to a chain in a manner which overcomes the foregoing disadvantages. The novel connector device comprises a socket member for receiving a complementary wedge member therein and a connector member threadedly engagable with the socket member and adapted to be secured to one link of the chain. The wedge member may be inserted within the wire rope in lieu of a portion of the core of the rope whereby the wedge is surrounded by individual strands of the wire rope. This may be done by unraveling a portion of one end of the wire rope in order to expose the core portion thereof. A sufficient length of the core portion may be cut away or otherwise removed from the wire rope. The wedge may then be placed between the strands of the rope in the position formerly occupied by the removed core portion. The end of the wire rope may be inserted through the socket member prior to the unraveling thereof and when the wedge has been positioned between the strands of the wire rope, the socket member may be moved longitudinally along the wire rope until the wedge is disposed within the socket member in such a manner that the strands of the wire rope are interposed between the outer periphery of the wedge and the inner periphery of the socket member.

The connector member comprises an internally threaded sleeve portion at one end adapted for threaded engagement with the outer periphery of the socket member, and a yoke member at the opposite end thereof adapted to receive a portion of one chain link therein. When the chain link has been inserted into the yoke member a sufficient distance, a pin is inserted through the arms of the yoke member and extends therebetween for locking the chain link to the connector member. As the connector member is tightened onto the socket member by means of the threaded connection therebetween, the outer periphery of the chain link is brought into engagement with the free or exposed end of the wedge member for applying longitudinal pressure thereto. In this manner the wire rope strands are securely clamped between the wedge member and the socket. A lock ring is interposed between the connector member and the socket and a suitable tool may be utilized for locking the ring between the socket and connector to substantially preclude disengagement therebetween.

In order to disengage the connector member from the socket member when it is desired to remove the wire rope from connection with the chain, the locking tabs of the locking ring may be straightened by any suitable tool, and the connector member may be unthreaded from the socket member. A flat washer of any well known type may be placed over the free end of the wedge and a screw nut of any suitable type may be threadedly engaged with the free end of the wedge, thus backing the wedge out of the socket member and releasing or relieving the pressure on the strands of the wire rope.

BRIEF DESCRIPTION OF THE DRAWINGS

FIG. 1 is a side elevational view of a wire rope connected to a chain by a connector device embodying the invention.

FIG. 6 is a side elevational view, partly in section, depicting the releasing means utilized for removing the wedge member from the socket member during disconnecting of the wire rope from the chain.

FIG. 7 is a plan view of a lock ring as utilized in the invention.

DESCRIPTION OF THE PREFERRED EMBODIMENT

Figure 2:
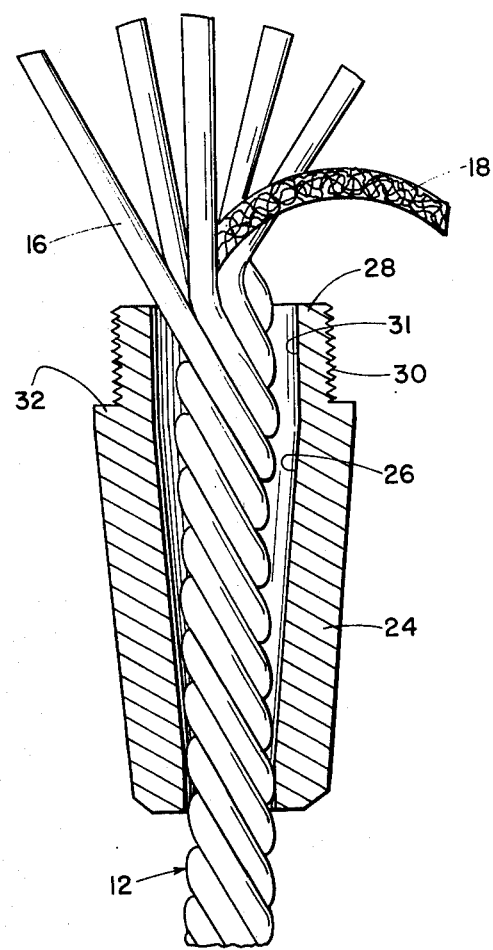
FIG. 2 is a sectional elevational view, partly in elevation, of a socket member as utilized in the invention, and having one end of a wire rope extending longitudinally therethrough for depicting an initial step in connecting the wire rope to the chain.

Referring to the drawings in detail, reference character 10 generally indicates a connector device for connecting a wire rope 12 to a chain 14. The wire rope 12 may be of any suitable type, and as shown herein comprises a plurality of individual strands 16 wound around a centrally disposed longitudinally extending fiber core 18 (FIG. 2). The chain 14 may also be of any suitable type, and as shown herein comprises a plurality of individual link members 20, with one link member 20A being engaged by the connector device 10, and another link member 20B being connected with a suitable hook member 22, or the like.

The connector device 10 comprises a socket member 24 of a generally elongated conical configuration, and having a central bore 26 extending longitudinally therethrough. The bore tapers downwardly and inwardly as viewed in FIGS. 2 through 5, for a purpose as will be hereinafter set forth. A reduced diameter neck portion 28 is provided at one end of the socket 24 and is externally threaded as shown at 30. An outwardly directed annular shoulder 32 is provided around the outer periphery of the socket 24 at the terminus of the threaded neck member 28. In addition, the portion 31 of the bore 26 in alignment with the neck member 28 is substantially straight sided for a purpose as will be hereinafter set forth.

A wedge member generally indicated at 34 is provided with a downwardly and inwardly tapered outer periphery as viewed at 36 in the drawings, said tapered configuration of the wedge 34 being complementary to the tapered configuration of the bore 26. A reduced diameter longitudinally extending neck portion 38 is provided at one end of the wedge member 34 extending in an opposite direction with respect to the tapered portion 36 and is externally threaded for a purpose as will be hereinafter set forth. The wedge member 34 is adapted for insertion with the bore 28 of the socket member 24 in order to securely clamp the strands 16 of the wire rope 12 therebetween as will be hereinafter set forth in detail.

A connector member generally indicated at 40 (FIGS. 4 and 5) is provided for the device 10 and comprises a sleeve member 42 having a central threaded bore 44 extending longitudinally therein for threaded connection with the threaded portion 30 of the socket member 24. An inwardly directed circumferential flange or shoulder 46 is provided at one end of the sleeve 42 for providing a central bore 48 in communication with the bore 44. A yoke member comprising a pair of spaced longitudinally extending arm members 50 and 52 project from the sleeve member 42 for receiving a portion of the link member 20A therebetween. The arms 50 and 52 are provided with aligned bores 54 and 56 for receiving a locking pin 58 therethrough, and the pin 58 is locked or securely retained in position within the bores 56 and 58 by a locking sleeve 60. Whereas the locking sleeve 60 may be of any suitable type, it is preferable that it be of the split tension sleeve type as shown in my prior U.S. Pat. No. Re27,620. The pin 58 and locking sleeve 60 securely retain the link member 20A in position between the arms 50 and 52 of the yoke member.

Figure 5:
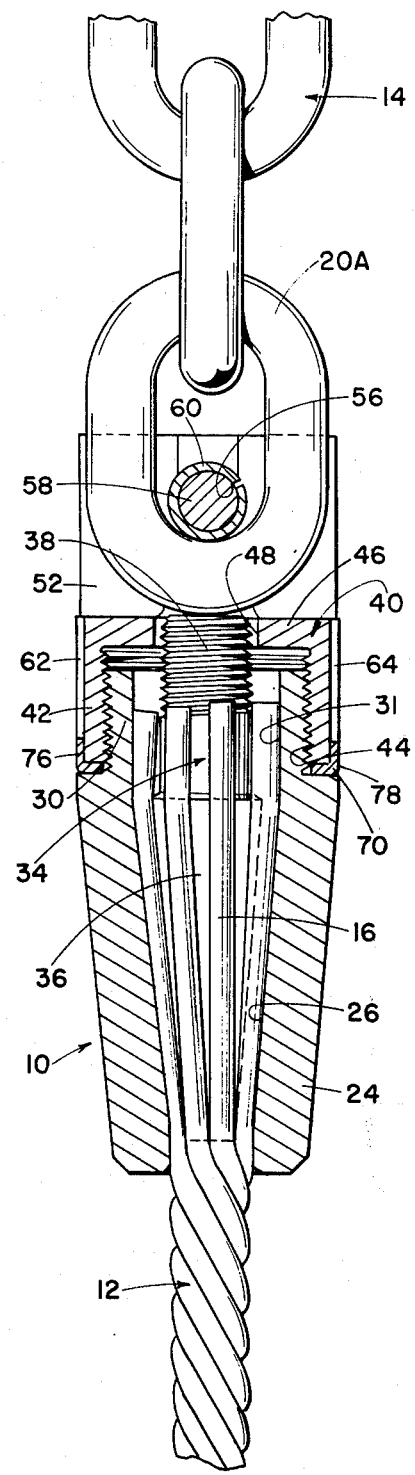
FIG. 5 is a view similar to FIG. 4 illustrating still another step in connecting wire rope to a chain.
Figure 4:
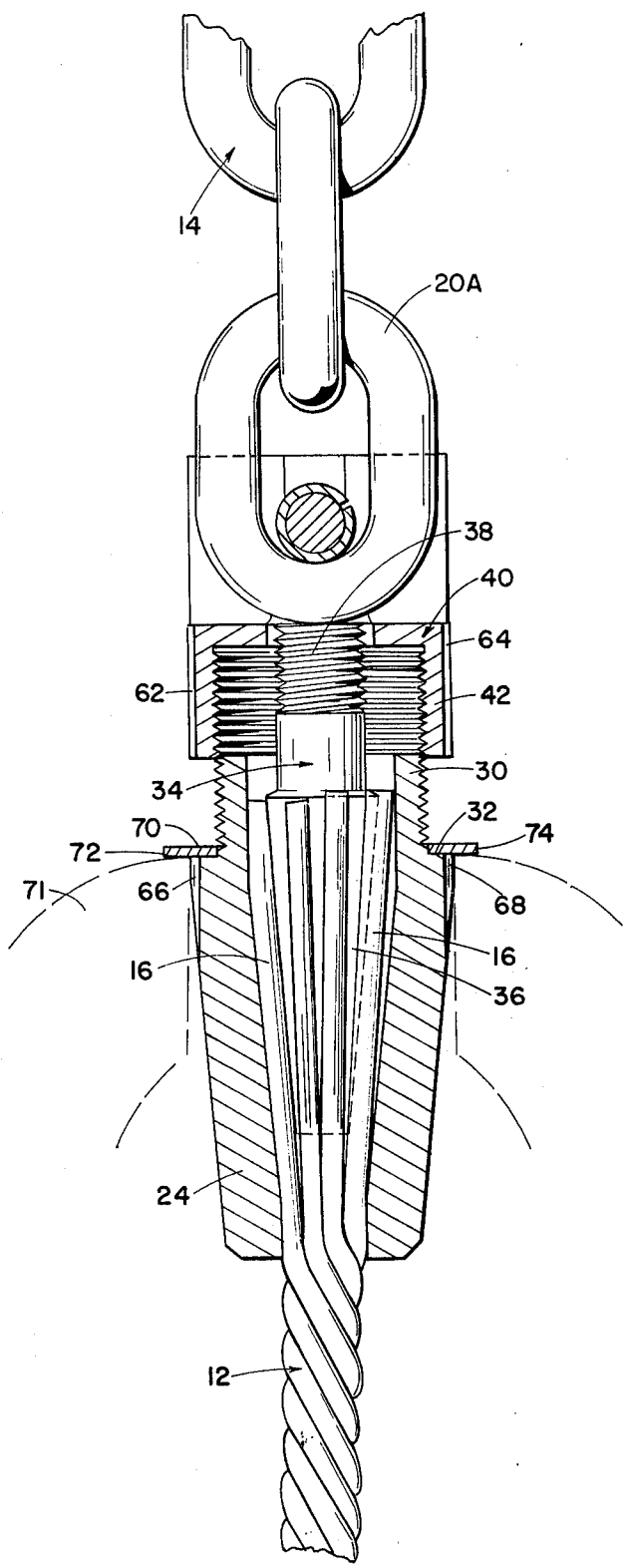
FIG. 4 is a sectional elevational view, partly in elevation, illustrating the connector device of the invention in still another step in connecting the wire rope to the chain.

The outer or open end of the sleeve 42 is provided with a pair of diametrically opposed longitudinally extending grooves or recesses 62 and 64 (FIGS. 4 and 5). In addition, a pair of diametrically opposed recesses 66 and 68 are provided on the outer periphery of the socket member 34 conterminous with the shoulder 32 as particularly shown in FIG. 4. The grooves 62, 64, 66 and 68 cooperate with a lock ring 70 for locking the connector member 40 with the socket member 24 in the assembled clamping position of the device 10 as will be hereinafter set forth. The lock ring 70 is of a generally annular configuration as shown in FIG. 7, and is provided with a first pair of diametrically opposed, outwardly extending tab members 72 and 74, and a second pair of diametrically opposed outwardly extending tab members 76 and 78. The tabs 72 and 74 are preferably substantially perpendicularly arranged with respect to the tabs 76 and 78 in order that the tabs may be utilized for locking the socket member 34 and connector member 40 in an assembled position as will be hereinafter set forth.

In order to connect the wire rope 12 to the chain 14 by the connector device 10, the connector member 40 may be secured to the chain link 20A by inserting the link between the arms 50 and 52 of the yoke member and passing the pin 58 through the apertures 54 and 56, through the locking sleeve 60, and across the interior of the link 20A as particularly shown in FIGS. 1, 4 and 5. In this manner the connector 40 is secured or fastened to the chain link 20A.

Figure 3:
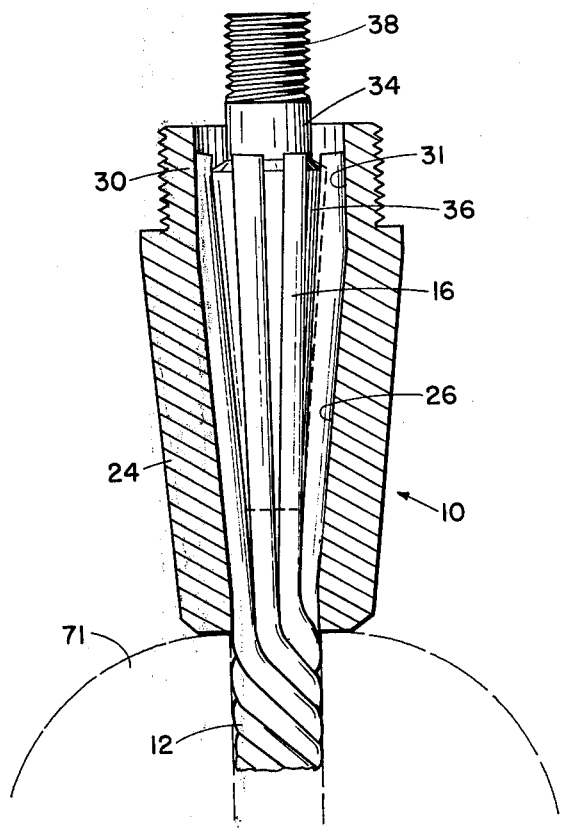
FIG. 3 is a sectional elevational view, partly in elevation, of a socket member and wedge member of the invention in assembled relation with strands of the wire rope clamped therebetween, illustrating a second step in connecting the wire rope to the chain.

In order to connect the wire rope 12 to the socket 24 it is preferable to initially insert one end of the rope through the bore 26 of the socket member 24 as particularly shown in FIG. 2. A sufficient length of the rope 12 should extend beyond the socket 24 in order to permit the unwinding or unravelling of a portion of the rope end to separate the individual strands 16 and expose the core 18. A length of the core member 18 may then be cut away or otherwise removed from the unravelled portion of the rope 12, and the wedge member 34 may be positioned between the individual strands 16 in the position formally occupied by the core member 18. The strands 16 may then be positioned around the outer periphery of the wedge 34, and the socket member 24 may be moved longitudinally along the rope 12 and over the wedge member 34 until the outer ends of the rope strands 16 are positioned at approximately the longitudinal center of the straight sided portion 31 of the bore 26, as shown in FIG. 3. In this position, the strands 16 will be clamped between the outer periphery of the wedge 34 and the bore 36, and the threaded neck portion 38 of the wedge 34 will extend longitudinally outwardly from the neck portion 30 of the socket member 24.

The lock ring 70 may then be placed on the shoulder 32 of the socket 24, with one pair of tabs, such as the tabs 72 and 74 being in substantial alignment with the recesses 66 and 68 of the socket 24. The connector member 40 may be secured to the socket 24 by threadedly securing the sleeve 42 to the neck 30 as shown in FIG. 4. In order to facilitate threading of the sleeve 42 onto the neck 30, it is preferable to place the socket 24 in a vise 71, or the like, for holding the socket securely during the connecting operation. As the threads of the sleeve 42 and neck 30 are engaged, the outer periphery of the chain link member 20A is brought into engagement with the exposed end of the stem or neck 38 of the wedge member 34 for exerting a longitudinal force on the wedge 34 and urging the wedge 34 longitudinally into the bore 26. Of course, as the sleeve 42 is tightened onto the neck 30, the wedge 34 is pressed into the bore 26. Of course, as the sleeve 42 is tightened onto the neck 30, the wedge 34 is pressed into the bore 26 to the limit of the engagement of the link 20A as shown in FIG. 5, thus assuring an efficient pressure clamping of the strands 16 between the wedge 34 and bore 26. It has been found that initially chain link 20A is tightly forced against the end of the neck 38 of the wedge member 34, once a tension load is placed on the sling further wedging movement takes place leaving link 20A freedom to move about pin 58 and locking sleeve 60.

When the connector member 40 is completely threaded onto the socket member 24, the outer end of the sleeve 42 will be in engagement with the lock ring 70 disposed on the shoulder 32. When this occurs, the sleeve 42 is preferably orientated with respect to the socket 24 and lock ring 70 so as to position the recesses 62 and 64 in substantial alignment with the other pair of tabs, such as the tabs 76 and 78. A suitable tool, such as pliers or the like (not shown), may then be utilized in the usual manner for bending the tabs 72 and 74 into engagement with the recesses 66 and 68, respectively, and the tabs 76 and 78 into the recesses 62 and 64, respectively. This precludes relative rotation between the connector member 40 and socket member 24 for securely retaining the connector device 10 in the assembled position, with the strands 16 of the wire rope 12 clamped therein, and the chain link 20A secured thereto.

When it is desired to disconnect the chain 14 from the wire rope 12 for any reason, the tabs 72, 74, 76 and 78 may be straightened by a pry bar or the like (not shown) in order to unlock the connector 40 from the socket 24. The sleeve 42 may then be unthreaded or backed off from the neck 30, and the connector may be removed from the socket 24. Additionally, the pin 58 may be removed from the bores 54 and 56, and the connector 40 may be released from engagement with the chain link 20A, if desired. A suitable washer member 80 may be placed on the outer end of the neck 30 and around the stem member 38 as shown in FIG. 6, and a suitable nut 82 may be screwed onto the neck 38, thus backing the wedge 34 out of the bore 26 to the position indicated in broken lines in FIG. 6. The wedge 34 may then be removed from the bore 26, and the wire rope 12 may be pulled from the socket 24.

From the foregoing it will be apparent that the present invention provides a novel means for connecting wire rope to a chain which comprises a socket member having an internal bore adapted to receive a wedge member therein for clamping the individual strands of the wire rope therebetween. A connector is threaddedly engageable with the socket member and adapted for connection with one link of the chain in such a manner that the chain link engages the wedge member for securely wedging the strands of the wire between the wedge and the socket. Locking ring means is provided for cooperating between the connector member and socket member to preclude accidental disengagement therebetween, and releasing means is provided for disconnecting the connector member from the socket and backing the wedge away from the pressure engagement in order to permit removal of the wire rope from the apparatus. The novel connector device is simple and efficient in operation and economical and durable in construction.

Whereas the present invention has been described in particular relation to the drawings attached hereto, it should be understood that other and further modifications, apart from those shown or suggested herein may be made within the spirit and scope of this invention.

Figure 8:
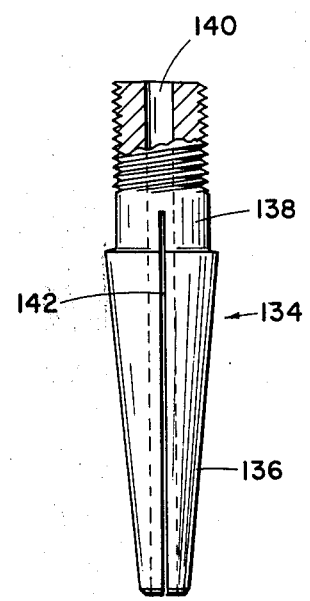
FIG. 8 is a plan view, partly cut-away depicting a wedge for use with metal core wire rope.

For instance, when the wire rope is of the type having a metal core therein a wedge of the type shown in FIG. 8 is used in lieu of wedge 36. In this embodiment wedge 134 includes the tapered periphery 136 and threaded neck portion 138 as heretofore described. The wedge, however, includes a longitudinal and central bore 140 which is adapted to receive the inner metal core of the wire rope. Additionally, the sleeve is divided into two portions, preferably longitudinally split partially by a slit 142, e.g. 0.02 to 0.04 inch wide.

Figure 9:
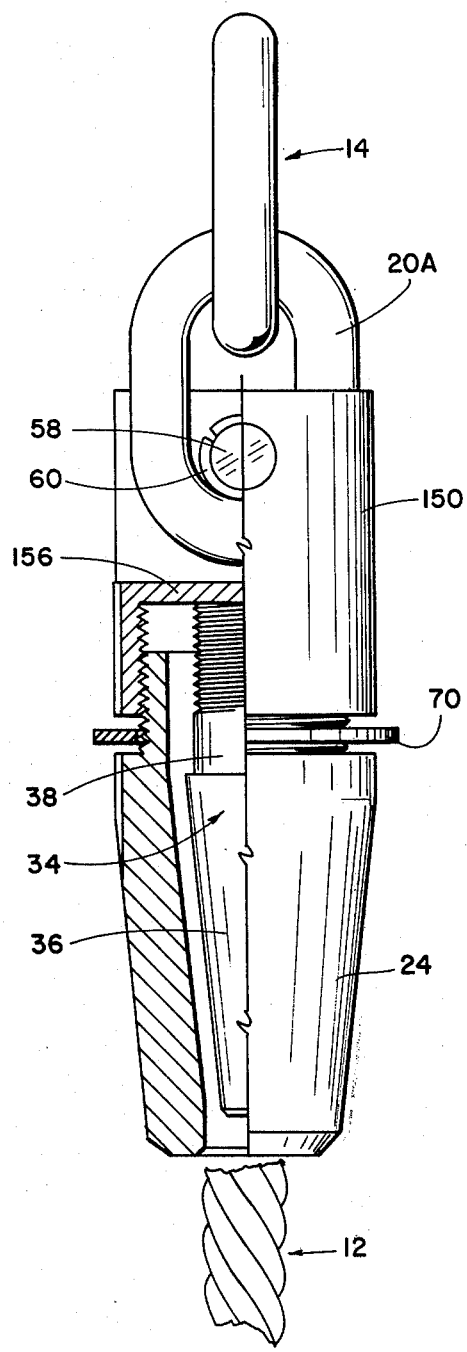
FIG. 9 is an assembly view of an alternate construction of the connector of this invention.

In the embodiment of FIG. 9 connector member 150 is modified to include a shoulder 156 that extends across the connector which intersects the neck end of wedge 34 instead of link 20A of chain 14.

What is claimed is:

1. A connector device for connecting multi-strand wire rope to a chain and comprising,
    socket means having a longitudinal tapered bore extending therethrough for receiving the wire rope therethrough,
    a unitary solid wedge of tapered configuration complimentary to said tapered bore cooperating with the wire rope and socket means for clamping the strands of wire rope therebetween,
    chain connector means removably engagable with said socket means to force said chain against said wedge in said clamping and assembled position,
    longitudinally extending engagement means provided on one end of said wedge and accessible upon removal of connector means for facilitating removal of said wedge from said socket means,
    locking means for locking said connector means in said assembled position.

2. A connector device as set forth in claim 1 and including tab means on said lock ring means for locking engagement between the connector means in one position of said tab means and for permitting disassembly of the connector device in another position of the tab means.

3. A connector device as set forth in claim 1 wherein the socket means is provided with an externally threaded portion, and the connector means is provided with an internally threaded portion for engagement with the socket means.

4. A connector device as set forth in claim 1 wherein the lock ring means includes a first pair of diametrically opposed tab members adapted for locking engagement with the socket means, and a second pair of diametrically opposed tab members adapted for locking engagement with the connector member.

5. A connector as set forth in claim 1, wherein said longitudinally extending engagement means is a threaded cylindrical neck portion.

* * * * *